Patented June 20, 1944

2,351,786

UNITED STATES PATENT OFFICE 2,351,786

TERPENE RESIN

Alfred L. Rummelsburg, Wilmington, Del., assignor to Hercules Powder Company, Wilmington, Del., a corporation of Delaware No Drawing. Application December 23, 1941,
Serial No. 424,140

5 Claims. (Cl. 260—92.6)

This invention relates to a method of preparing hydrocarbon resins and, more particularly, it relates to resins of that character derived from terpenes using hydrogen fluoride as a catalyst. It also relates to products therefrom.

The use of a polybasic acid catalyst other than hydrogen fluoride in the preparation of hydrocarbon resins from terpenes causes an emulsification of the polymer to occur during the catalyst removal operation. The use of metal halides as catalytic agents cause the introduction of inorganic materials in the final polymer. These metal halides are difficult to remove during the catalyst removal operation and remain to contaminate the polymer.

Now, in accordance with this invention, an improved polymerized terpene resin is obtained by treating the terpenes with hydrogen fluoride.

More particularly, the improved terpene resins in accordance with this invention are obtained by treating a terpene as, for example, allo-ocimene, etc., preferably in an inert solvent, with hydrogen fluoride which may be added to a terpene-inert solvent solution in either a gaseous or a liquid state.

The method in accordance with this invention is illustrated by the following specific examples, all parts and percentages being by weight unless otherwise specified.

EXAMPLE

*Allo-ocimene resin with anhydrous hydrogen fluoride*

In this example, 100 g. of 95% allo-ocimene was dissolved in 200 g. of toluene and placed in a suitable copper vessel provided with a copper inlet tube, a copper stirring mechanism having an oil seal, a copper thermometer well, and a copper reflux condenser which was cooled by means of circulating ice water. 20 g. of anhydrous hydrogen fluoride was passed into the solvent solution of allo-ocimene during vigorous agitation and the hydrogen fluoride addition operation was carried out at a temperature of 10–20° C. After complete addition of the hydrogen fluoride, agitation of the hydrogen fluoride allo-ocimene toluene mixture was continued for about 6 hours and the mixture was maintained at a temperature between 20 and 45° C. At the end of the agitation period, the reaction mixture was washed with water. After the water washing operation, the mixture was washed with an aqueous 10% caustic solution at a temperature of 60° C. After removal of the caustic solution from the mixture, the mixture was subjected to a water washing operation at 60° C. The solvent and unpolymerized allo-ocimene was removed by a distillation operation employing a temperature of about 180° C. and a pressure of about 15 mm. A yield of 85 g. of allo-ocimene resin was obtained and was characterized as a viscous oil. Color graded G. The $(SCN)_2$ number was 160.

A preferred general procedure in accordance with the present invention involves treating a solution of the terpene to be polymerized in a suitable volatile organic solvent which is inert under the conditions which result in polymerization of the terpene, and using a reaction vessel which is not appreciably corroded by the catalyst as, for example, a stainless steel bomb or copper vessel. The mixture is treated for a period of time sufficient to bring about the desired polymerization of the raw material. The treatment will be carried out either at normal or at elevated temperature and at either normal or elevated pressure, and the conditions of the treatment are variable within relatively wide limits.

The hydrogen fluoride may be employed either in the anhydrous or the aqueous form. When employed in the anhydrous form, it may be used either in the liquid or the gaseous state. The hydrogen fluoride is preferably employed in substantially anhydrous state, however, hydrogen fluoride containing as much as 10 to 20% water may be operable. If desired, the liquid hydrofluoric acid containing not more than about 20% water may be contacted with the terpene to be polymerized at temperatures which are substantially higher than the boiling point of liquid hydrofluoric acid (20° C.) Under these conditions, a pressure system for the introduction of the hydrofluoric acid is necessary.

Where the anhydrous hydrogen fluoride is employed in the gaseous form, it may be bubbled into the terpene to be polymerized in the desired quantity and during agitation of the terpene solution. When employing gaseous anhydrous hydrogen fluoride at atmospheric pressure, it is preferable to employ a halogenated solvent such as ethylene dichloride or other halogenated solvents enumerated herein, because of the somewhat greater solubility of hydrogen fluoride therein. However, if the reaction is carried out under super-atmospheric pressure, the gaseous anhydrous hydrogen fluoride readily dissolves in any of the solvents herein enumerated.

When operating under pressure and using either the liquid or gaseous substantially anhydrous hydrogen fluoride, it is preferred to maintain a pressure such that the major part of the hydrogen fluoride is in a non-gaseous form, i. e., either in the liquid form or in a dissolved form by reason of the pressure employed. In some cases, where liquid anhydrous hydrogen fluoride is employed, it may be present in three distinct forms, the first form being as liquid hydrogen fluoride in droplets emulsified throughout the reaction mixture. The second form as dissolved in the solvent or the terpene being polymerized, and the third form as a gas either above or intermingled through the reaction mixture by reason of the agitation.

Where hydrogen fluoride is employed in the form of aqueous hydrofluoric acid, it is preferred to have a concentration of hydrogen fluoride of about 40% by weight. The concentration of hydrogen fluoride in the acid may vary from about 75% by weight up to about 97% by weight. Solutions having a concentration of hydrogen fluoride above about 62% are generally prepared by dissolving the required amount of liquid anhydrous hydrofluoric acid in water to the desired concentration.

Solvents which may be employed as carriers of the terpenes to be polymerized, and which solvents will be substantially inert under the polymerizing action set up by the catalytic hydrogen fluoride agent used are benzene, toluene, xylene, gasoline, cyclohexane, paramethane, decahydronaphthalene, ethylene dichloride, ethyl chloride, dichloroethyl ether, chloroform, ether, etc. Solvents such as glacial acetic acid may be employed where acyclic terpenes, allo-ocimene and myrcene are used. Where the acyclic terpenes are used, it is found that only a very small amount of the terpene combines with the glacial acetic acid solvent.

The concentration of the terpene in the solvent may vary within wide limits, for example, between about 10 and about 95% in the solvent. The employment of a solution having a concentration of either 50 to 95% by weight of the terpene to be polymerized is particularly advantageous. While the use of high concentration of terpene to be polymerized in a solvent favors the achievement of the highest melting point in the shortest reaction time, such high concentration may often cause increased color in the product and is sometimes disadvantageous.

During the hydrogen fluoride polymerization treatment of the terpene, a small amount of precipitate or sludge may sometimes form which, when separated or filtered off at the end of the reaction period, tends to remove color bodies and thus give a lighter colored product.

The temperature may be between about $-20°$ C. and about $+200°$ C. but is preferably maintained between about $5°$ C. and about $100°$ C. during the hydrogen fluoride polymerization operation. At temperatures much below $0°$ C. the reaction is very slow and the time required is relatively long. At temperatures above $100°$ C. it is necessary to carry out the polymerization operation in a comparatively short period of time in order to prevent the decomposition of the terpene being polymerized.

The amount of catalyst employed will vary depending upon the temperature at which the treatment is carried out. In general, the ratio of catalyst to terpene may vary from 0.005 to 0.25. Preferably a catalyst-terpene ratio ranging from 0.02 to 0.1 is employed. Where the anhydrous form of hydrogen fluoride is used as a catalytic agent, a lesser amount is needed as compared to the amount needed where aqueous hydrogen fluoride is used. As the temperature is increased, smaller amounts of catalyst produce the same satisfactory results as larger amounts of catalyst produce when lower temperatures are used. However, the amount of catalyst should not be such an amount as to require a relatively long period of time to obtain the desired degree of polymerization.

The time required for carrying out the treatment depends upon several factors among which are the concentration of the terpene in the solvent and in the reaction mixture, the concentration of catalyst, the temperature employed, the extent of polymerization desired, the pressure at which the reaction is conducted, etc. In general, the time may vary from 1 hour to 24 hours. It is preferred to carry out the polymerization operation under conditions such that the polymerization time ranges from about 3 to about 15 hours.

The polymerization treatment may be carried out either at atmospheric pressure or at superatmospheric pressure. The pressure may vary from 1 atmosphere to 100 atmospheres. When operating under pressure, it is preferred to use a suitable pressure resisting vessel such as an autoclave or a bomb. The use of super-atmospheric pressure is advantageous because it speeds up the reaction in maintaining the hydrogen fluoride in condensed form (either liquid or dissolved), and permits the use of high temperatures. In addition, when employing a diluent which is gaseous at ordinary temperatures and pressures, the diluent is maintained in liquid form during the treatment.

Following the hydrogen fluoride polymerization operation, the resulting polymerized mixture is treated with water to easily remove the catalyst. Washing with cold or hot water will remove substantially all of the catalyst. It is found advantageous to employ aqueous caustic solution at some stage during the washing operation to hasten the removal of the hydrogen fluoride catalyst from the polymer. The polymer may be washed again to free it of the caustic solution. Thereafter, the alkaline treated and water washed solution of polymer is treated to remove the solvent. This may be done in any convenient manner as by distillation, preferably in vacuo, leaving the polymerized terpene as residue. Following the distillation treatment, the polymerized product ranges from a viscous oil to a soft solid and is further characterized as being unsaturated, having a triocyanate value ranging from about 60 to 160. The low molecular weight polymers may be removed from the polymerized product by means of vacuo distillation, leaving higher melting point polymers as residue, thereby increasing the hardness characteristic of the product. The polymerized product, may, if desired, be treated to improve its color as, for example, by contacting a solution thereof in a petroleum solvent with an adsorbent such as activated clay, activated carbon, fuller's earth, selective solvents such as furfural, etc.

The process according to the present invention may be carried out either intermittently or in a continuous manner. The process may be made continuous in several ways as, for example, by continuously introducing a stream of the terpene to be polymerized in a solution in an organic solvent and hydrogen fluoride either gaseous or liquid to a polymerizing zone, continuously withdrawing the reaction mixture, and continuously recovering the polymer therefrom in any desired manner, the hydrogen fluoride being recycled continuously.

Various types of terpenes may be treated according to the process of the present invention such as, ocimene, allo-ocimene, myrcene, etc. Instead of employing a single terpene, mixtures of terpenes may be treated by the present invention.

Preferably, the reaction is carried out in equipment of corrosion resisting material such as chrome steel, stainless steel, and the like. Copper equipment may be employed, the hydrogen fluoride forming a protective film of copper fluoride. It should be noted that when a copper reaction vessel is employed for carrying out the hydrogen fluoride polymerization of terpene in an aromatic solvent, there is a tendency for the terpene to condense with the aromatic solvent if the reaction period is prolonged beyond about 20 hours at about 20° C., or about 10 hours at about 40°.

The hydrogen fluoride polymerization operation may be desirably conducted in an inert atmosphere using such inert gases as nitrogen or carbon dioxide. The use of an inert atmosphere facilitates the production of pale colored polymers. The products may be heat bleached at temperatures of from 25 to 35° C., preferably in an inert atmosphere of nitrogen or carbon dioxide.

The polymers produced by means of the hydrogen fluoride polymerization operation are useful in protective coatings, and textile finishing composition and as adhesives.

From the foregoing, it will be seen that the present invention provides a materially improved process for the polymerization of terpenes. The use of hydrogen fluoride as the polymerization catalyst provides a method of easily removing the catalyst from the reaction mixture to produce a polymer of high purity.

What I claim and desire to protect by Letters Patent is:

1. The process of producing a terpene polymer which comprises polymerizing allo-ocimene in the presence of hydrogen fluoride at a temperature between about −20° C. and about 200° C.

2. The process of producing a terpene polymer which comprises polymerizing an acyclic terpene in the presence of hydrogen fluoride, at a temperature between about −20° C. and about 200° C., until polymerization is substantially complete.

3. The process of producing a terpene polymer which comprises polymerizing a solvent solution of an acyclic terpene in the presence of hydrogen fluoride, at a temperature between about 0° C. and about 100° C., and separating the terpene polymer from the reaction mixture.

4. The process of producing a terpene polymer which comprises polymerizing myrcene in the presence of hydrogen fluoride, at a temperature between about −20° C. and about 200° C., until polymerization is substantially complete.

5. The process of producing a terpene polymer which comprises polymerizing myrcene in the presence of hydrogen fluoride, at a temperature between about 0° C. and about 100° C., until polymerization is substantially complete, and separating the terpene polymer from the reaction mixture.

ALFRED L. RUMMELSBURG.

CERTIFICATE OF CORRECTION.

Patent No. 2,351,786.  June 20, 1944.

ALFRED L. RUMMELSBURG.

It is hereby certified that error appears in the printed specification of the above numbered patent requiring correction as follows: Page 2, second column, line 51, for "triocyanate" read --thiocyanate--; and that the said Letters Patent should be read with this correction therein that the same may conform to the record of the case in the Patent Office.

Signed and sealed this 15th day of August, A. D. 1944.

(Seal)

Leslie Frazer

Acting Commissioner of Patents.